June 14, 1938.   F. W. ROBISON   2,120,261
PROCESS FOR BLENDING FRUIT JUICES
Filed Sept. 27, 1935
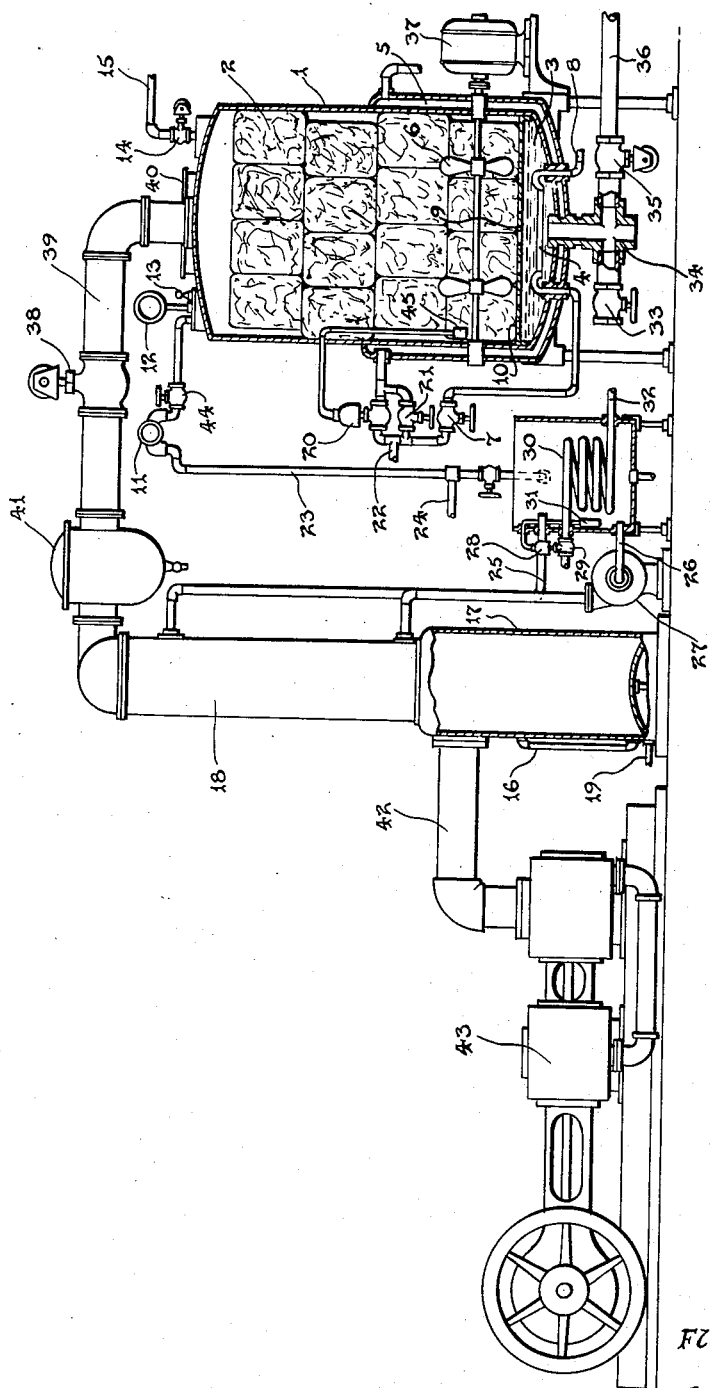
Inventor
Floyd W. Robison,
By
Attorney Patented June 14, 1938

2,120,261

UNITED STATES PATENT OFFICE 2,120,261

PROCESS FOR BLENDING FRUIT JUICES

Floyd W. Robison, Detroit, Mich., assignor to Pure Fruit Juices, Inc., Detroit, Mich., a corporation of Michigan Application September 27, 1935, Serial No. 42,543

3 Claims. (Cl. 99—155)

My present invention has for one of its objects the provision of an effective and efficient method for blending non-free oxygenous juices from tree-ripened fruit of the same genus but of different species, sub-species or varieties, as well as a non-free oxygenous product of such fruit juices having chemical and physical characteristics comparable to those possessed by juice expressed from immature, market fruit.

Recognizing the fact that tree-ripened, fully mature fruit yields juice having appreciably different taste characteristics than the juice expressed from immature, or market fruit, I find that juice from selected species of the same genus, possessing certain desirable characteristics common to the genus as a whole, but not completely existent in the juice of any specific species, sub-species, or variety of said genus; will, when blended in that proportionate ratio determined by their respective chemical and physical properties, produce a fruit juice comparable in color, taste and physical appearance, to the juice expressed from immature, market fruit.

It is well known, that the consumer market for certain fruit juices, particularly those of the citrous group, is supplied from whole fruit picked prior to its natural maturity, and that juice expressed from such fruit possesses measurable chemical and physical characteristics, definitely differentiating its taste characteristics from that of juice expressed from tree-ripened and fully mature fruit; and that this taste difference is dependent upon the relative degree of maturity established prior to picking, during the natural cycle of growth.

I have found that the present consumer market for fruit juices, notably those of the citrous group, is substantially predicated upon the appearance and taste characteristics of juice expressed by the consumer from immature fruit of the variety concurrently obtainable in the open market; and that the appearance and taste characteristics of juice from such fruit varies in accordance with the species of variety of fruit harvested and shipped to market from different geographical areas.

I have also found that a packaged juice, expressed from tree-ripened, fully matured fruit of the same variety as the immature fruit concurrently obtainable in the open market, is not wholly acceptable to the consumer, due to its unfamiliar taste characteristic, although the nutritive and other values of such juice can be shown to be superior to that of juice from immature fruit.

I have further found that consumer acceptance of a packaged fruit juice is substantially predicated upon its similarity in taste, appearance and physical structure, to that of juice as ordinarily expressed by the consumer, from immature fruit concurrently obtainable on the open market.

The primary object, therefore, of the blending process herein described, is the method of blending non-free oxygenous juices from several species, sub-species of varieties of tree-ripened fruit having chemical and physical properties which will, when combined in that proportionate ratio determined by their respective chemical and physical properties, produce a non-free oxygenous fruit juice comparable in at least taste and physical appearance to the juice expressed by the consumer from immature, market fruit, concurrently obtainable in the open market.

Another object of the blending process herein described, is the method of blending non-free oxygenous juices from tree-ripened, mature fruit, grown in one geographical area, with the non-free oxygenous juices from tree-ripened, mature fruit grown in other geographical areas, thereby providing a diversified source of supply of sufficient variation in chemical and physical characteristics to produce, by blending said juices, a non-free oxygenous product comparable in color, taste, aroma, and physical appearance, to the juice expressed by the consumer from immature, market fruit.

For purposes of comparison and illustration, the average principal chemical and physical characteristics of juices from three varieties of the fruit, Citrus aurantium, tree-ripened and fully matured, are as follows:

Chemical and physical characteristics of typical juices from tree-ripened, mature fruit

| | Cal. navel "A" | Fla. Valencia "B" | Cal. Valencia "C" |
|---|---|---|---|
| Specific gravity | 1.06 | 1.04 | 1.06 |
| Total solids | 12.56% | 11.00% | 11.80% |
| Sugars | 9.12% | 8.50% | 8.51% |
| Acid | 1.50% | 0.75% | 1.12% |
| Color value | 100 | 100 | 100 |
| Ester value | 100 | 100 | 100 |
| Ratio—sugars to acid | 6.1 to 1 | 11.3 to 1 | 7.6 to 1 |

These three varieties constitute the great bulk of the orange supply to the consuming public and major source of orange juice to the consumer as it is at present expressed from immature market fruit. The California navel juice designated as "A", and the California Valencia juice designated as "C", are representative juices from fruit originating in one geographical area; the Florida Valencia juice, designated as "B", is representative of the juice from fruit originating in another geographical area.

Also, for illustrative as well as comparative purposes, I have shown the average principal physical and chemical characteristics of orange juice as expressed by the consumer from the same varieties of fruit, although in an immaturely developed state, as only such oranges are available on the open market, as follows:

*Characteristics of juice expressed by the consumer from immature, market fruit, available during the period December thru May*

|  | Cal. navel | Fla. Valencia |
|---|---|---|
| Specific gravity | 1.05 | 1.04 |
| Total solids | 11.75% | 10.50% |
| Sugars | 8.75% | 7.75% |
| Acid | 1.50% | 1.00% |
| Color value | 75 | 50 |
| Ester value | 75 | 50 |
| Ratio of sugars to acid | 5.8 to 1 | 7.7 to 1 |

Thus, during the period of December thru May, the source of supply of orange juice is confined to two varieties of orange,—California navel and Florida Valencia. Referring to the comparative chemical and physical characteristics of juices from these fruits, it will be seen that the taste characteristics, as determined by the ratio of sugars to acid, are widely separated. It will also be observed that the characteristics of the juice from tree-ripened fruit of the same variety vary materially from the characteristics of the juice expressed from immature, market fruit.

It follows that a juice having taste characteristics known to be acceptable to the consumer during this period, is as designated at "D", as follows:

Blend

30% A–70% B

"D"

| | |
|---|---|
| Specific gravity | 1.046 |
| Total solids | 11.47% |
| Sugars | 8.68% |
| Acid | 0.975% |
| Color value | 100 |
| Ester value | 100 |
| Ratio—sugars to acid | 8.9 to 1 | and may be produced by blending the juices from tree-ripened California navels "A" with the juices from tree-ripened Florida Valencias "B", in the proportion of 30% "A" to 70% "B", which lends to the resultant product the desirable high color, and some of the tartness of the navel orange, combined with the thinner, sweeter characteristics of the juice from the Florida Valencia orange.

During the period June thru November the consumer market for orange juice is principally supplied from California Valencia oranges. The taste characteristic of this juice from immature market fruit, as determined by the ratio of sugar to acid, varies materially from that expressed from tree-ripened fruit, of the same variety as will be seen by a comparison of "C" as above with the following table of juice characteristics of the immature fruit:

|  | Cal. Valencia | Blend 30% B–70% C "E" |
|---|---|---|
| Specific gravity | 1.04 | 1.054 |
| Total solids | 11.50% | 11.56% |
| Sugars | 8.50% | 8.51% |
| Acid | 1.30% | 1.01% |
| Color value | 75 | 100 |
| Ester value | 50 | 100 |
| Ratio—sugars to acid | 6.5 to 1 | 8.5 to 1 |

It follows then, that a blended juice, designated as "E", consisting of 30% "B", or juice from the Florida Valencia, tree-ripened fruit, and 70% "C", or juice from the California Valencia, tree-ripened fruit, provides a juice product nearly identical with that expressed from the immature, market, California Valencia orange, but having the desirable high color and ester values of tree-ripened fruit. Thus a product results which, while wholly and purely an orange juice, and without adulteration of any kind, consisting as it does of a blend of the juices of different species of the same genus of tree ripened fruit, has been made comparable to, and simulating, the taste and physical properties of juices which the consumer has been in the habit of expressing from immature market fruit, as well as a product which is free of any charge of adulteration and is, in fact, superior to the juice of immature fruit in that it retains the color and ester values of the ripe fruit from which it is obtained. In thus simulating the taste and physical properties of the juices of immature market fruit, while retaining the color and ester values of ripe fruit, it is plain there is overcome, as far as it is possible to overcome, the natural sales resistance of the general public to the packaged fruit juices.

It will be understood that in mentioning tree ripened fruit it is intended to include vine ripened fruit as well, and that in referring to species of the same genus of fruit, it is meant to comprehend also the varieties of such species so as to include all seasonal fruits of the same class.

It will be noted that the blends comparable to the juice of the variety concurrently available as immature fruit in the consumer market are each constituted, in the largest proportion, of juice from tree-ripened fruit of that same variety, thereby reducing to a minimum, production, processing and storage of juices not immediately replaceable from currently maturing fruit.

Furthermore, the present invention relates to fruit juices previously treated and packed to maintain their original non-free oxygenous condition, and having for this purpose an imposed non-oxidizing gas content, and I have shown in the accompanying drawing, in a single figure, a diagrammatic view of the apparatus essential in carrying out the blending process and at the same time maintaining the non-free oxygenous condition of the juice.

Assuming the juices to be blended have been previously produced in a non-free oxygenous condition or state with an imposed non-oxidizing gas by a process such as, for instance, the process described and claimed in my copending application Serial Number 721,619, filed April 20, 1934, and packed in bulk containers, and sustained in a frozen state in cold storage, I have shown in the drawing, the essential apparatus for the conversion of said juices from the solid to the liquid state, and the maintenance of their non-free oxygenous condition, while being blended.

Referring now to the drawing, the process tank 1 is first cleaned and sterilized by any suitable means, as by admitting water to the tank thru pipes 24 and 23, by opening valve 44, and such water is heated by steam in jacket 5, admitted thru valve 21, from steam line 22. The sterilizing water is subsequently drained from the tank thru bottom outlet 34, and valve 33.

Valve 44 is now opened, and approximately two gallons of cold water, 3, as shown by flow water 11, is admitted to tank 1. The juices according to the desired blend, properly identified and proportioned as to fruit origin, variety and chemical characteristics, and in bulk containers, are moved from below-freezing to room temperature for a period sufficient to free the wholly frozen contents from said containers. The containers are then opened, and the frozen cakes of juice transferred thru opening 40 to tank 1. The liquid and the solid juice is protected from free oxygen during the transfer from container to tank 1, by the non-oxidizing gas content established in the juice prior to freezing of the same in the containers, which will be released as the temperature of the juice rises.

It will be noted that tank 1 is equipped with perforated partition 9, separating the frozen juice cakes 2, from the water 3. Valve 38, in vacuum line 39, is now opened and vacuum pump 43 started. When a sub-barometric pressure of approximately 29" has been attained in tank 1, steam from line 22, thru valve 7, is admitted to heating coil 4 in the water 3. The previously admitted two gallons of water 3, is by means of heating coil 4 brought to a temperature of approximately 100° F., which, at the reduced sub-barometric pressure of 29", is sufficient to cause active ebullition. The water vapor given off from boiling water 3, as it is drawn upward thru the frozen cakes of juice, 2, by the vacuum pump 43 induces a surface melting of said frozen juice cakes, thereby releasing from the juice so melted, the non-oxidizing gas occluded during the processing of the juices prior to freezing thereof.

As this slow liquefaction continues, the gas released from the juice 2, fills tank 1, above the level of the now deaerated boiling water 3, and as the pump 43 continues to maintain a 29" sub-barometric pressure in tank 1, said non-oxidizing gas, together with any remaining oxygen in tank 1, passes to the atmosphere.

When sufficient liquefaction has taken place to raise the level of juice above the jacketed area 5, of tank 1, the steam supply to coil 4 is shut off at valve 7, and valve 20 is opened, admitting steam to jacket 5.

The temperature of the liquid juice is now raised to a uniform temperature of approximately 100° F. and so maintained by the thermostatic spud 45, controlling steam valve 20.

The entire content of tank 1 is now in an active state of ebullition, and this condition is maintained until sufficient water vapor has passed thru the vacuum line 39 to the condenser 18, to deposit two gallons of condensate in receiver 17, as determined by the sight gauge 16. At this point, substantially all of the water 3 and the non-oxidizing gas has been removed from the liquid juice, leaving said juice as sterile and non-free oxygenous as it was, prior to blending. Valve 14, in gas line 15, is now opened, admitting a non-oxidizing gas to tank 1, relieving the sub-barometric pressure, and continuing until atmospheric pressure is attained in tank 1, as indicated by pressure gauge 12. Automatic vent 13 provides for gas expansion or excess pressure.

The blended, non-free oxygenous juice is now ready for subsequent processing or packaging, and, when required, is transferred from tank 1, thru outlet 34, valve 35, and pipe line 36.

If, instead of frozen juices, juices are to be blended in a liquid state, laden with non-oxidizing gas and previously sustained in cold storage at a temperature above freezing, such juices are introduced into the tank 1 after the water 3 has been heated and deaerated, and the blending process proceeds from this point as above described.

What is claimed is:

1. A method of blending non-free oxygenous, non-oxidizing gas-laden fruit juices of ripe fruit and maintaining said juices in a non-free oxygenous state, which comprises transferring said juices, in a frozen state, from containers to a process tank, then heating water in said process tank, coincident with a 29" sub-barometric pressure, thereby producing an active state of ebullition of said water, the rising vapors therefrom causing slow liquefaction of the solid juices, releasing occluded, non-oxidizing gas from said juices, which are drawn from the tank with such free oxygen as may remain, by the pumping action incident to maintaining the sub-barometric pressure, then admitting steam to the jacket surrounding the tank, to heat the liquid portion of the juices to 100° F., coincident with sub-barometric pressure of 29", thereby causing active ebullition of the entire juice content of the tank, then continuing said active ebullition until sufficient water vapor has been drawn from the tank to produce approximately two gallons of condensate, and then relieving the sub-barometric pressure imposed on the juice in the tank, by admitting sufficient non-oxidizing gas to restore atmospheric pressure, thereby blending non-free oxygenous, non-oxidizing gas-laden fruit juices, and maintaining them in a non-free oxygenous state.

2. A method of blending non-free oxygenous, non-oxidizing gas-laden fruit juices of ripe fruit and maintaining said juices in a non-free oxygenous state, which comprises admitting approximately two gallons of water to a process tank, boiling said water by means of a steam jacket around said tank, thereby sterilizing the tank, and then transferring the liquid juice from containers to said tank, and then heating the juices to approximately 100° F., coincident with an imposed sub-barometric pressure of approximately 29", thereby providing an active state of ebullition of said juices, releasing occluded non-oxidizing gas, which is driven from the tank with such free oxygen as may be present, then continuing said active ebullition of the juice until sufficient water vapor has been drawn off to produce approximately two gallons of condensate, and then relieving the sub-barometric pressure imposed on the juice in the tank, by admitting sufficient non-oxidizing gas to restore atmospheric pressure, thereby blending non-free oxygenous, non-oxidizing gas-laden fruit juices, and maintaining them in a non-free oxygenous state.

3. A method of blending non-free oxygenous, non-oxidizing gas-laden fruit juices of ripe fruit and maintaining said juices in a non-free oxygenous state, which comprises heating mixed juices in a closed container to a temperature sufficient to bring about active ebullition at a sub-barometric pressure of approximately 29", whereby to release occluded non-oxidizing gas, discharging from the container any free oxygen and also removing the released gas, and subsequently supplying non-oxidizing gas to the container whereby to relieve the sub-barometric pressure and at the same time permit the mixed juices to reabsorb gas to again bring about their previous gas-laden condition.

FLOYD W. ROBISON.